US011478118B1

(12) United States Patent
Ebrahimi Afrouzi

(10) Patent No.: US 11,478,118 B1
(45) Date of Patent: Oct. 25, 2022

(54) METHOD FOR AUTOMATICALLY REMOVING OBSTRUCTIONS FROM ROBOTIC FLOOR-CLEANING DEVICES

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 57 days.

(21) Appl. No.: 16/703,561

(22) Filed: Dec. 4, 2019

Related U.S. Application Data

(63) Continuation of application No. 15/792,119, filed on Oct. 24, 2017, now Pat. No. 10,524,627.

(Continued)

(51) Int. Cl.
| | | |
|---|---|---|
| *A47L 9/28* | (2006.01) | |
| *A47L 9/00* | (2006.01) | |
| *G06K 9/62* | (2022.01) | |
| *G05D 1/02* | (2020.01) | |
| *G06V 10/10* | (2022.01) | |

(Continued)

(52) U.S. Cl.
CPC ............. *A47L 9/2852* (2013.01); *A47L 9/009* (2013.01); *A47L 9/2805* (2013.01); *A47L 9/2884* (2013.01); *G05D 1/0238* (2013.01); *G06K 9/6256* (2013.01); *G06V 10/10* (2022.01); *G06V 10/40* (2022.01); *G06V 10/751* (2022.01); *G06V 20/58* (2022.01); *A47L 2201/04* (2013.01); *G06V 2201/07* (2022.01); *Y10S 901/01* (2013.01); *Y10S 901/47* (2013.01)

(58) Field of Classification Search
None
See application file for complete search history.

(56) References Cited

U.S. PATENT DOCUMENTS

| | | |
|---|---|---|
| 6,076,226 A | 6/2000 | Reed |
| 6,605,156 B1 | 8/2003 | Clark |

(Continued)

FOREIGN PATENT DOCUMENTS

JP 2016148950 A * 8/2016

OTHER PUBLICATIONS https://docs.idew.org/code-robotics/references/physical-inputs/wheel-encoders (Year: 2021).*
JP 2016148950 A Machine Translation (Year: 2016).*

*Primary Examiner* — Michelle M Entezari

(57) ABSTRACT

Some embodiments include a robot, including: a plurality of sensors; at least one encoder; a processor; a tangible, non-transitory, machine readable medium storing instructions that when executed by the processor effectuates operations including: measuring, with the at least one encoder, wheel rotation of at least one wheel; capturing, with an image sensor, images of an environment as the robot moves within the environment; identifying, with the processor, at least one characteristic of at least one object captured in the images of the environment; determining, with the processor, an object type of the at least one object based on characteristics of different types of objects stored in an object database; and instructing, with the processor, the robot to execute at least one action based on at least one of: the object type of the at least one object and the measured wheel rotation of the at least one wheel.

19 Claims, 5 Drawing Sheets

Related U.S. Application Data

(60) Provisional application No. 62/404,331, filed on Oct. 5, 2016.

(51) Int. Cl.
*G06V 10/40* (2022.01)
*G06V 10/75* (2022.01)
*G06V 20/58* (2022.01)

(56) References Cited

U.S. PATENT DOCUMENTS

| | | |
|---|---|---|
| 7,761,954 B2 | 7/2010 | Ziegler |
| 9,457,471 B2 | 10/2016 | Schnittman |
| 2004/0179720 A1* | 9/2004 | Chen .................. G06K 9/00221 382/118 |
| 2007/0044265 A1* | 3/2007 | Crevling, Jr. ....... A47L 11/4091 15/246.2 |
| 2012/0265391 A1* | 10/2012 | Letsky ................. G05D 1/0088 701/25 |
| 2015/0197012 A1* | 7/2015 | Schnittman ............ G05D 1/027 700/250 |
| 2017/0049288 A1* | 2/2017 | Knutson ............. A47L 11/4088 |
| 2017/0080570 A1 | 3/2017 | Schnittman |
| 2017/0190051 A1* | 7/2017 | O'Sullivan ............ G06N 20/00 |
| 2017/0273528 A1* | 9/2017 | Watanabe ............... H04N 7/188 |
| 2018/0016778 A1* | 1/2018 | Arnott .................. A47L 11/4041 |
| 2018/0206686 A1* | 7/2018 | Shigeto ................. A47L 9/0411 |
| 2019/0061846 A1* | 2/2019 | Buesing .................. A47L 9/009 |
| 2020/0337513 A1* | 10/2020 | Johnson .............. A47L 11/4011 |

* cited by examiner ated. METHOD FOR AUTOMATICALLY
REMOVING OBSTRUCTIONS FROM
ROBOTIC FLOOR-CLEANING DEVICES

CROSS-REFERENCE TO RELATED
APPLICATIONS

This application is a Continuation of U.S. Non-Provisional application Ser. No. 15/792,119, filed Oct. 24, 2017, which claims the benefit of U.S. Provisional Application No. 62/404,331, filed Oct. 5, 2016, each of which is hereby incorporated by reference.

FIELD OF THE DISCLOSURE

The disclosure relates to robotic floor-cleaning devices and methods for automatically removing obstructions from robotic floor-cleaning devices.

BACKGROUND

During operation, robotic floor-cleaning devices may encounter obstructions on work surfaces, which may become entangled in one or more wheels of the device, preventing the device from completing work. Several solutions have been proposed in prior art to detect wheel obstructions. For example, the amount of electrical current generated by an individual wheel motor has been used to detect obstructions as the electrical current drawn to rotate a wheel increases when the wheel is obstructed. Once an obstruction is detected, the wheel is programmed to stop rotating and the robotic device reverses direction until the electrical current is below a certain threshold, at which time the robotic device may resume operation. Sensors have also been used to detect entanglement with similar response of wheel reversal upon detection. This method may not be ideal as the robotic device is required to operate in the opposite direction for a period of time until the entanglement is removed which is inefficient and increases cleaning time. Furthermore, in certain cases, large objects may be drawn up by a wheel and lodged above it or an object may become tightly wound around the wheel. In these situations, further jamming could occur wherein the wheel can neither operate normally in the forward nor reverse direction to remove the entangled object. Generally, in prior art, the wheels are reversed to remove obstructions. A more precise and efficient method for removing an obstruction from a wheel may be beneficial.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments include a robot, including: a plurality of sensors; at least one encoder; a processor; a tangible, non-transitory, machine readable medium storing instructions that when executed by the processor effectuates operations including: measuring, with the at least one encoder, wheel rotation of at least one wheel; capturing, with an image sensor, images of an environment as the robot moves within the environment; identifying, with the processor, at least one characteristic of at least one object captured in the images of the environment; determining, with the processor, an object type of the at least one object based on characteristics of different types of objects stored in an object database; and instructing, with the processor, the robot to execute at least one action based on at least one of: the object type of the at least one object and the measured wheel rotation of the at least one wheel.

Some embodiments include a method for detecting an obstruction to a robot, including: measuring, with at least one encoder, wheel rotations of at least one wheel; capturing, with an image sensor, images of an environment as the robot moves within the environment; identifying, with a processor, at least one characteristic of at least one object captured in the images of the environment; determining, with the processor, an object type of the at least one object based on characteristics of different types of objects stored in an object database; and instructing, with the processor, the robot to execute at least one action based on at least one of: the object type of the at least one object and the measured wheel rotations of the at least one wheel.

Some embodiments include a tangible, non-transitory, machine readable medium storing instructions that when executed by a processor effectuates operations including: measuring, with at least one encoder, wheel rotations of at least one wheel; capturing, with an image sensor, images of an environment as the robot moves within the environment; identifying, with the processor, at least one characteristic of at least one object captured in the images of the environment; determining, with the processor, an object type of the at least one object based on characteristics of different types of objects stored in an object database, including: determining, with the processor, a percentage of characteristics of the at least one object matching the characteristics of at least one object stored in the object database; and determining, with the processor, the object type of the at least one object based on the object type of the at least one object in the object database corresponding with a percentage above a predetermined threshold or the highest percentage; and instructing, with the processor, the robot to execute at least one action based on at least one of: the object type of the at least one object and the measured wheel rotations of the at least one wheel, including: determining, with the processor, if the object type of the at least one object is a type of object with high likelihood of obstructing the robot; and identifying, with the processor, an obstruction of the at least one wheel based on the measured wheel rotations of the at least one wheel.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

Figure 1:
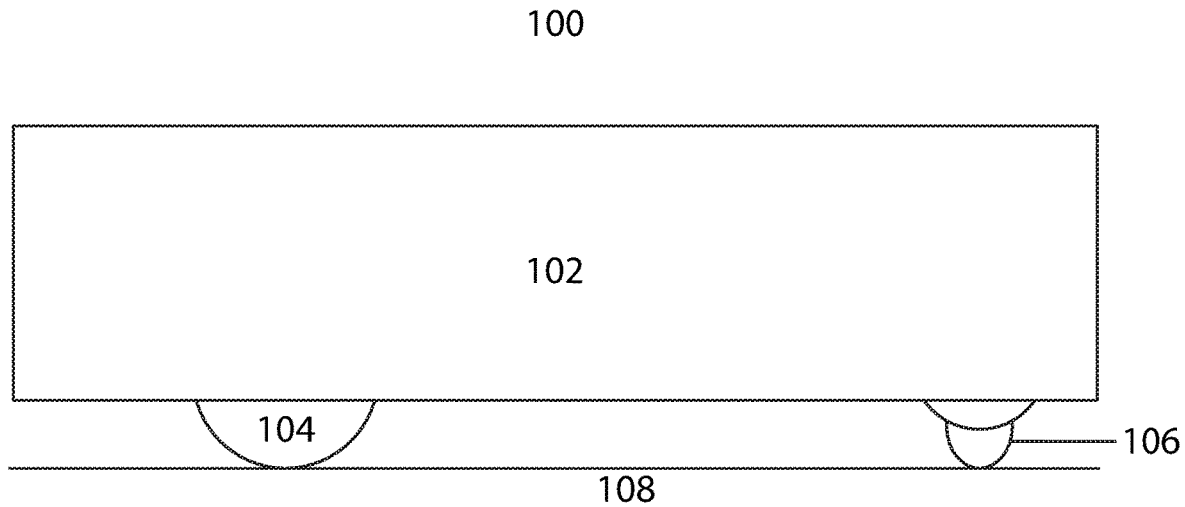
FIG. 1 illustrates a side view of a robotic floor-cleaning device, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As understood herein, the term "robot" or "robotic device" or "robotic floor-cleaning device" may be defined generally to include one or more autonomous devices having communication, mobility, and/or processing elements. For example, a robot or robotic device may include a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., and one or more clock or synchronizing devices.

Some embodiments include a method to automatically remove obstructions from a robotic device after becoming entangled with the robotic device during operation. Such instances may occur when objects accessible by robotic devices, such as electrical cords or wires, are left exposed on a work surface and robotic devices encounter them during operation. In some embodiments, upon sensing entanglement with an obstruction, the robotic floor-cleaning device may retract one or more wheels into a wheel housing within the main housing of the robotic device. In some embodiments, the obstruction entangled around the one or more wheels may be forcibly separated from the wheel by the corresponding wheel housing during retraction.

Some embodiments include a method to automatically remove objects entangled on or around wheels of robotic floor-cleaning devices. A robotic floor-cleaning device may have various methods for sensing an entanglement. For example, an odometer may be used to detect wheel rotation wherein slower than normal or lack of wheel rotation may indicate that a wheel is obstructed. In some embodiments, upon identifying that a wheel is obstructed, the robotic floor-cleaning device may retract the wheel into a wheel housing within the main housing of the robotic device. During retraction, any objects entangled around the one wheel may be forcibly separated from the wheel by the wheel housing as only the wheel is capable of fitting within the housing. Extraneous obstacles or objects may be pushed aside by the wheel housing as the wheel is retracted. In some embodiments, the wheel may be returned to the normal position and the robotic floor-cleaning device may resume cleaning. In some embodiments, a robotic floor-cleaning device may be able to identify the specific wheel on which an obstruction is occurring. In such cases, only the specific wheel where the obstruction is identified as occurring may be retracted.

FIG. 1 illustrates a side view of an example of a robotic floor-cleaning device 100. Robotic floor-cleaning device 100 includes housing 102, driving wheels 104 (only one of two wheels can be seen), and steering wheel 106. The robotic floor-cleaning device is driving on work surface 108.

Figure 2:
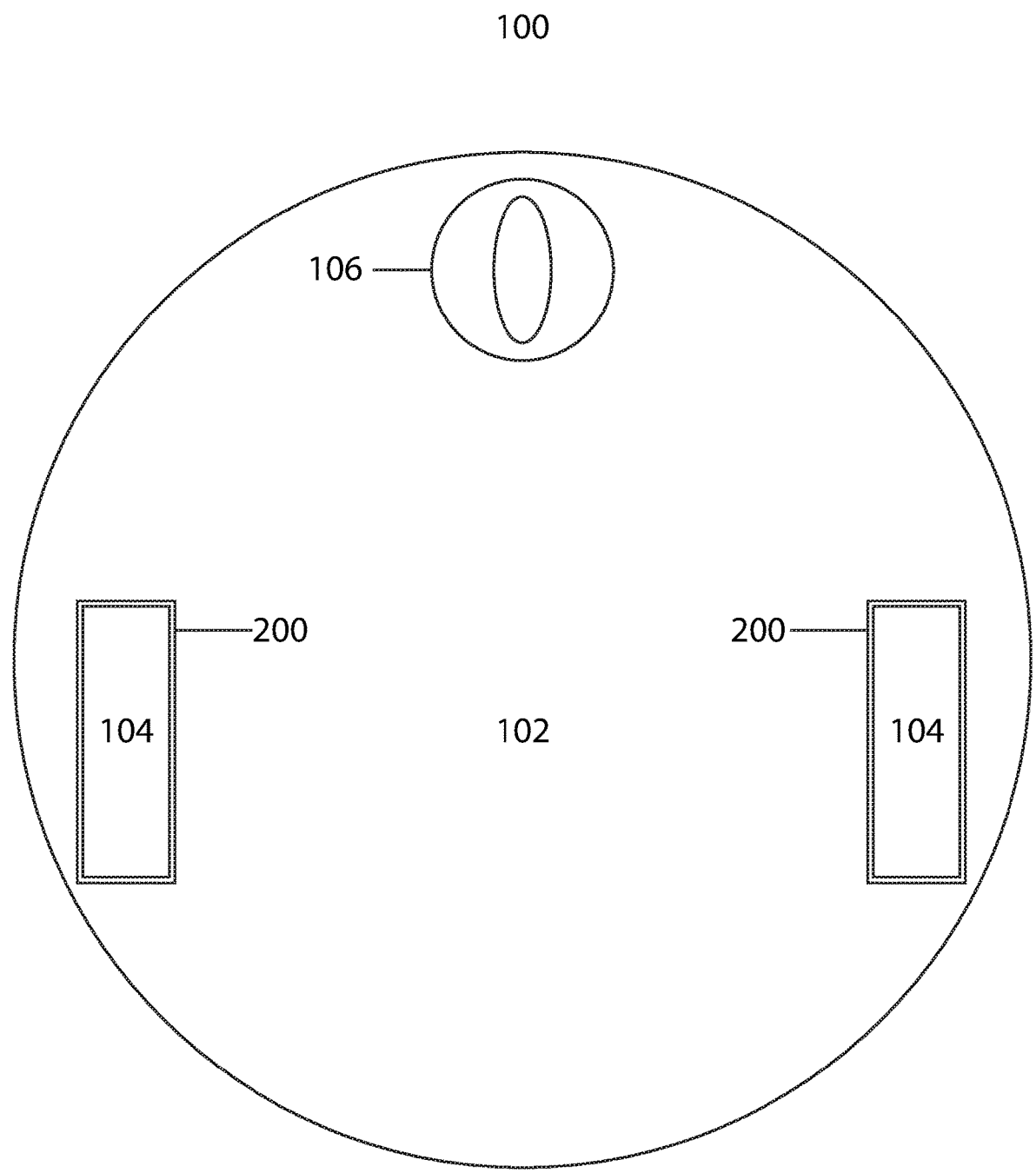
FIG. 2 illustrates a bottom view of a robotic floor-cleaning device, according to some embodiments.

FIG. 2 illustrates a bottom view of robotic floor-cleaning device 100. Robotic floor-cleaning device 100 includes housing 102, driving wheels 104, steering wheel 106, and wheel housings 200. Driving wheels 104 are retracted into the wheel housings 200 upon sensing entanglement with an object. In some embodiments, the wheel housings may only be capable of fitting a corresponding wheel within the housing such that obstructions are prevented from entering within the wheel housings due to a lack of space. It should be noted that robotic floor-cleaning devices with a different configuration and number/type of wheels may equally benefit from the proposed invention. The robotic floor-cleaning device shown is for illustrative purposes only and is not intended to be restrictive.

Figure 3:
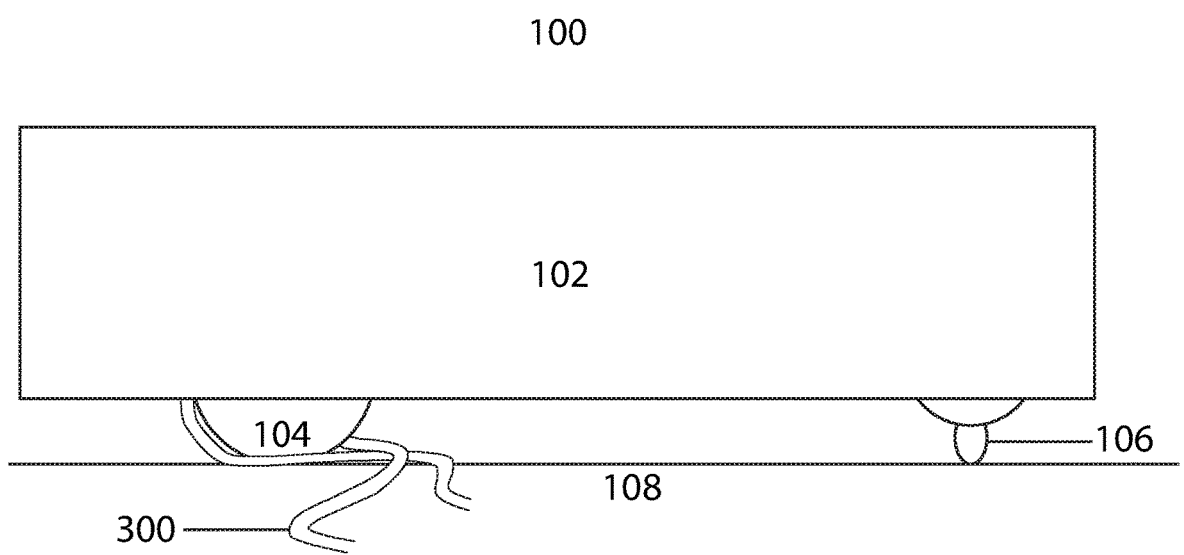
FIG. 3 illustrates a side view of a robotic floor-cleaning device becoming entangled with an electrical cord.

FIG. 3 illustrates a side view of robotic floor-cleaning device 100 becoming entangled with cord 300. As before, robotic floor-cleaning device 100 includes housing 102, driving wheels 104 and steering wheel 106. Robotic floor-cleaning device 100 operates on work surface 108 during which it encounters loose cord 300, which then becomes entangled in wheel 104.

Figure 4A:
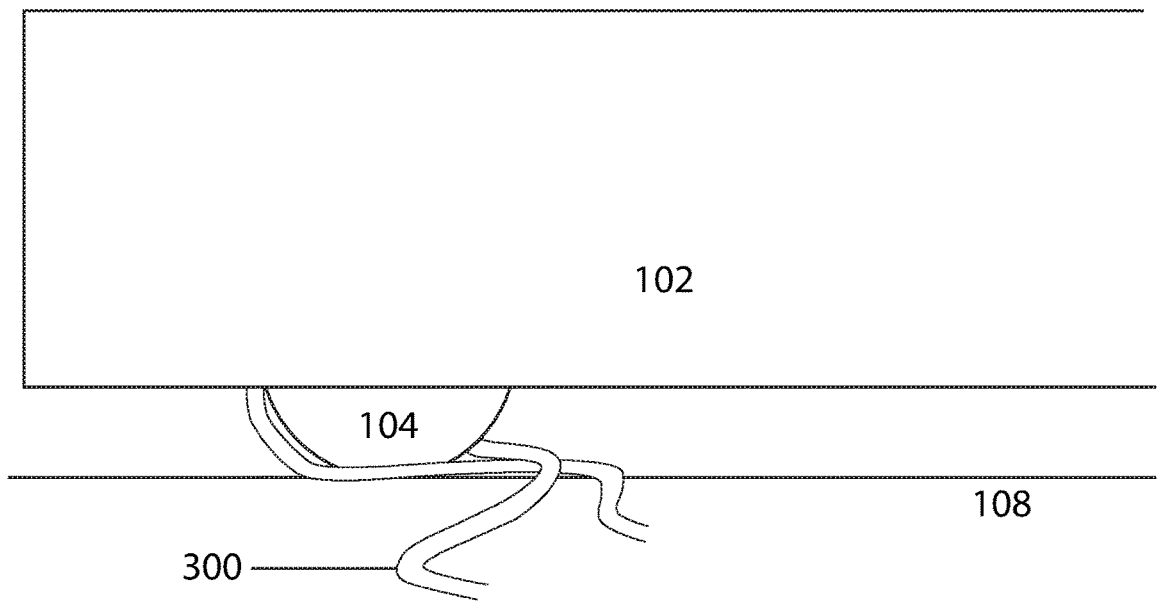
FIG. 4A illustrates a detailed side view of a robotic floor-cleaning device wheel entangled with an electrical cord.
Figure 4B:
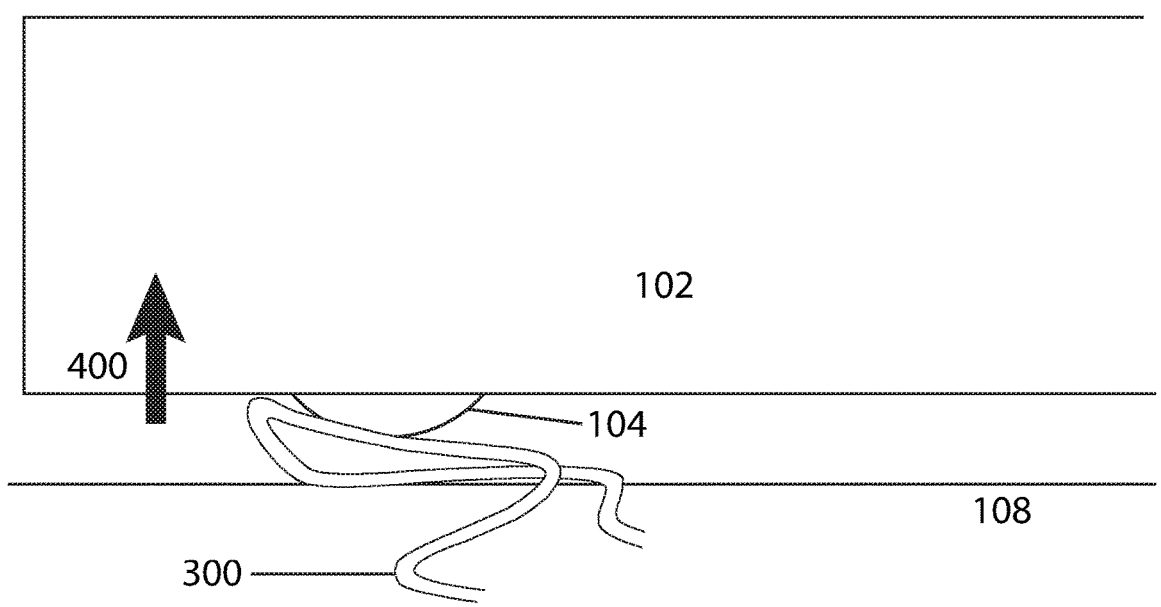
FIG. 4B illustrates a detailed side view of a robotic floor-cleaning device wheel being retracted to disentangle the wheel from an electrical cord.

FIG. 4A illustrates a side view of wheel 104 entangled with cord 300. FIG. 4B illustrates a side view of wheel 104 being retracted. Upon detecting the entanglement of cord 300, wheel 104 is programmed to retract by moving in upwards direction 400 into the corresponding wheel housing (not shown) located within robotic device housing 102 for a predetermined amount of time. As wheel 104 is retracted into the wheel housing, the entangled cord 300 is forcibly separated from the wheel as the wheel housing is only large enough to accommodate the corresponding wheel. In this way, any obstructions on or around the retracted wheel are forcibly pushed off as the wheel enters the wheel housing thus freeing the wheel from the obstruction.

Figure 5A:
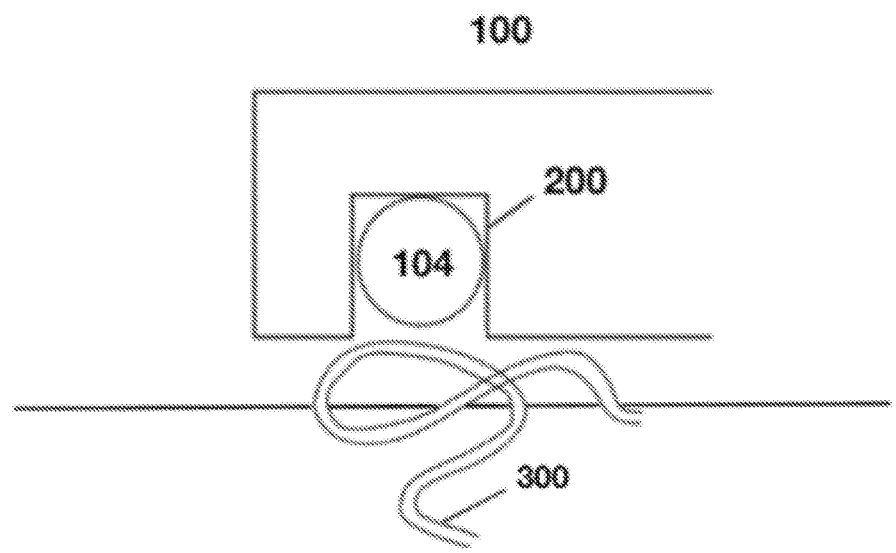
FIG. 5A illustrates a cross-sectional side view of a robotic floor-cleaning device wheel fully retracted and disentangled from an electrical cord.
Figure 5B:
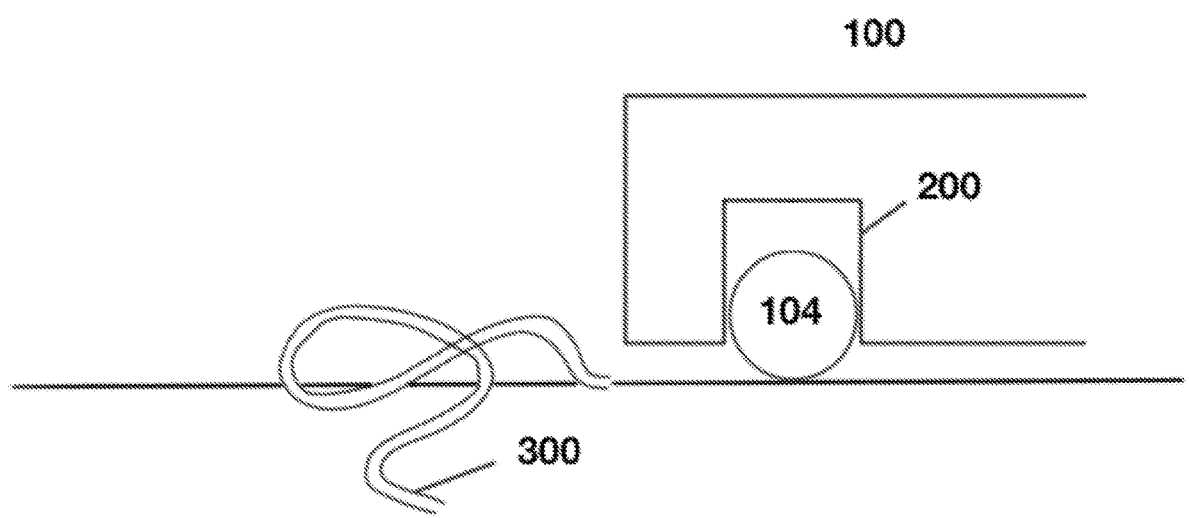
FIG. 5B illustrates a cross-sectional side view of a robotic floor-cleaning device wheel released after retraction and resuming normal operation.

FIG. 5A illustrates a cross-sectional side view of robotic floor-cleaning device 100 with fully retracted wheel 104 within wheel housing 200. Cord 300 has been forcibly separated from the wheel during retraction. FIG. 5B illustrates a cross-sectional side view of robotic floor-cleaning device 100 after disentanglement with the cord 300. After retraction for a predetermined amount of time, wheel 104 is released from housing 200 and normal operation is resumed.

Various methods may be employed to actuate wheel retraction. While some possible methods are provided herein, it should be understood that any available method for sensing an obstruction may be employed without limitation. The examples provided herein are for illustrative purposes only and are not intended to restrict the invention.

In some embodiments, an odometer may be used to monitor wheel rotation for the purpose of detecting a wheel obstruction. When wheel rotations are fewer than normal, something may be preventing a wheel from turning normally. In some embodiments, a number of wheel rotations over a predetermined amount of time less than a predetermined amount may indicate that a wheel is obstructed and wheel retraction may be actuated. In some embodiments, the robotic floor-cleaning device may have a separate odometer for each wheel, allowing the system to identify which wheels to retract, or the device may simply retract all driving wheels when the number of wheel rotations counted by an odometer are less than a predetermined amount.

In some embodiments, the electrical current drawn by a wheel may be monitored to determine when a wheel should be retracted. Since a higher electrical current corresponds to a wheel supporting a larger load, the amount of electrical current drawn may be used to indicate when a wheel is obstructed. When a wheel is obstructed, the wheel supports a larger load and the wheel draws a larger current to rotate. In some embodiments, an electrical current above a predetermined threshold may indicate a wheel obstruction and wheel retraction may be actuated. In some embodiments, a separate wheel motor may be used for each wheel and the amount of current used by each separate wheel motor may be monitored, thereby allowing the robotic floor-cleaning device to identify which wheels are obstructed and thus which wheels to retract.

In some embodiments, computer vision and deep learning may be used to identify objects that are likely to become entangled in the wheels of a robotic floor-cleaning device. A catalogue of various objects may be preloaded into a database stored in a memory unit. Characteristics of the various objects may be extracted using computer vision technology. Images of the work environment may be iteratively captured and the characteristics of those images may be extracted and compared to the objects in the database. For example, electrical cords, cables, and wires may be identified. In some embodiments, the threshold requirements for actuating wheel retraction may be lowered when a match or potential match is found. For example, a current threshold may be lowered upon identifying an object in the robotic floor-cleaning device path that matches at least a predetermined percent of the characteristics of one of the objects in the database. In another example, the threshold for number of wheel rotations within a predetermined time period may be lowered upon identifying a particular object. This means that when the robotic floor-cleaning device approaches the particular object its wheels may be retracted sooner than if the object had not been detected beforehand. Lowering the threshold requirements for actuating wheel retraction without this condition may lead to too many false positives, however, the added step of object recognition lowers the likelihood of wrongly identifying objects as items likely to become entangled, which may result in unnecessary wheel retractions.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

The invention claimed is:

1. A robot, comprising:
   a plurality of sensors;
   at least one encoder;
   a processor;
   a tangible, non-transitory, machine readable medium storing instructions that when executed by the processor effectuates operations comprising:
   measuring, with the at least one encoder, wheel rotations of at least one wheel;
   capturing, with an image sensor, images of an environment as the robot moves within the environment;
   identifying, with the processor, at least one characteristic of at least one object captured in the images of the environment;
   determining, with the processor, an object type of the at least one object based on characteristics of different types of objects stored in an object database; and
   instructing, with the processor, the robot to execute at least one action based on:
   identifying, with the processor, an obstruction entangled with the at least one wheel based on the measured wheel rotations of the at least one wheel, wherein a number of wheel rotations of the at least one wheel over a predetermined amount of time below a predetermined threshold indicates entanglement of the obstruction with the at least one wheel; and
   the object type of the at least one object;
   wherein the at least one action comprises retraction of the at least one wheel into a wheel housing within a main housing of the robot, wherein during retraction the obstruction is forcibly separated from the at least one wheel by physical contact with the main housing as only the at least one wheel fits within the wheel housing during retraction.

2. The robot of claim 1, wherein instructing the robot to execute the at least one action further comprises:
   determining, with the processor, if the object type of the at least one object is a type of object with high likelihood of obstructing the robot.

3. The robot of claim 1, wherein the operations further comprise:
   monitoring, with the processor, an electrical current drawn by at least one motor of the at least one wheel; and
   identifying, with the processor, an obstruction entangled with_the at least one wheel based on the electrical current drawn.

4. The robot of claim 1, wherein determining the object type of the at least one object further comprises:
   determining, with the processor, a percentage of characteristics of the at least one object matching the characteristics of at least one object stored in the object database; and
   determining, with the processor, the object type of the at least one object based on the object type of the at least one object in the object database with a percentage above a predetermined threshold or corresponding with the highest percentage.

5. The robot of claim 1, wherein the robot resumes a current task after executing the at least one action.

6. The robot of claim 1, wherein the at least one action comprises an action to remove the entangled obstruction from the at least one wheel of the robot such that the at least one wheel is no longer entangled with the obstruction.

7. The robot of claim 1, wherein the at least one action comprises an action to avoid obstruction of the robot by the at least one object.

8. The robot of claim 1, wherein the operations further comprise:
   identifying, with the processor, an obstruction entangled with the at least one wheel when an electrical current drawn by the at least one motor of the at least one wheel exceeds a predetermined threshold.

9. A method for detecting an obstruction to a robot, comprising:

measuring, with at least one encoder, wheel rotations of at least one wheel;

capturing, with an image sensor, images of an environment as the robot moves within the environment;

identifying, with a processor, at least one characteristic of at least one object captured in the images of the environment;

determining, with the processor, an object type of the at least one object based on characteristics of different types of objects stored in an object database; and instructing, with the processor, the robot to execute at least one action based on:
- identifying, with the processor, an obstruction entangled with the at least one wheel based on the measured wheel rotations of the at least one wheel, wherein a number of wheel rotations of the at least one wheel over a predetermined amount of time below a predetermined threshold indicates entanglement of the obstruction with the at least one wheel; and
- the object type of the at least one object;

wherein the at least one action comprises retraction of the at least one wheel into a wheel housing within a main housing of the robot, wherein during retraction the obstruction is forcibly separated from the at least one wheel by physical contact with the main housing as only the at least one wheel fits within the wheel housing during retraction.

10. The method of claim 9, wherein instructing the robot to execute the at least one action further comprises:
determining, with the processor, if the object type of the at least one object is a type of object with high likelihood of obstructing the robot.

11. The method of claim 9, further comprising:
monitoring, with the processor, an electrical current drawn by at least one motor of the at least one wheel; and
identifying, with the processor, an obstruction entangled with_the at least one wheel based on the electrical current drawn.

12. The method of claim 9, wherein determining the object type of the at least one object further comprises:
determining, with the processor, a percentage of characteristics of the at least one object matching the characteristics of at least one object stored in the object database; and
determining, with the processor, the object type of the at least one object based on the object type of the at least one object in the object database corresponding with a percentage above a predetermined threshold or the highest percentage.

13. The method of claim 9, wherein the robot resumes a current task after executing the at least one action.

14. The method of claim 9, wherein the at least one action comprises an action to remove the entangled obstruction from the at least one wheel of the robot such that the at least one wheel is no longer entangled with the obstruction.

15. The method of claim 9, wherein the at least one action comprises an action to avoid obstruction of the robot by the at least one object.

16. The method of claim 9, further comprising:
identifying, with the processor, an obstruction entangled with_the at least one wheel when an electrical current drawn by the at least one motor of the at least one wheel exceeds a predetermined threshold.

17. A tangible, non-transitory, machine readable medium storing instructions that when executed by a processor effectuates operations comprising:
measuring, with at least one encoder, wheel rotations of at least one wheel;

capturing, with an image sensor, images of an environment as the robot moves within the environment;

identifying, with the processor, at least one characteristic of at least one object captured in the images of the environment;

determining, with the processor, an object type of the at least one object based on characteristics of different types of objects stored in an object database, comprising:
- determining, with the processor, a percentage of characteristics of the at least one object matching the characteristics of at least one object stored in the object database; and
- determining, with the processor, the object type of the at least one object based on the object type of the at least one object in the object database corresponding with a percentage above a predetermined threshold or the highest percentage; and instructing, with the processor, the robot to execute at least one action based on at least one of: the object type of the at least one object and the measured wheel rotations of the at least one wheel, comprising:
- determining, with the processor, if the object type of the at least one object is a type of object with high likelihood of obstructing the robot; and
- identifying, with the processor, an obstruction entangled with the at least one wheel based on the measured wheel rotations of the at least one wheel, wherein a number of wheel rotations of the at least one wheel over a predetermined amount of time below a predetermined threshold indicates entanglement of the obstruction with the at least one wheel;

wherein the at least one action comprises retraction of the at least one wheel into a wheel housing within a main housing of the robot, wherein during retraction the obstruction is forcibly separated from the at least one wheel by physical contact with the main housing as only the at least one wheel fits within the wheel housing during retraction.

18. The medium of claim 17, wherein the at least one action comprises an action to avoid an obstruction.

19. The medium of claim 17, wherein the robot resumes a current task after executing the at least one action.

\* \* \* \* \*